Jan. 21, 1930. E. GEIGER Re. 17,568

GARAGE

Original Filed Feb. 18, 1926 2 Sheets-Sheet 1

WITNESSES

Geo. W. Naylor

Franklin J. Foster

INVENTOR

Ernst Geiger

BY Munn & Co

ATTORNEYS

E. GEIGER

Jan. 21, 1930. GARAGE Re. 17,568

2 Sheets-Sheet 2

Original Filed Feb. 18, 1926

WITNESSES
Gommingler
Franklin J. Foster

INVENTOR
Ernst Geiger
BY Munn & Co
ATTORNEYS

Reissued Jan. 21, 1930

Re. 17,568

UNITED STATES PATENT OFFICE

ERNST GEIGER, OF IRVINGTON, NEW JERSEY

GARAGE

Original No. 1,636,600, dated July 19, 1927. Serial No. 89,231, filed February 18, 1926. Application for reissue filed September 27, 1928. Serial No. 308,853.

An object of the present invention is to provide a garage in which a maximum number of cars may be stored in a minimum amount of space, and a garage in which the cars may be handled with ease and expedition, either when moving the cars into the storage space or driving them out of the garage.

A more specific object of the invention is to provide a garage preferably of relatively restricted cross-sectional area, built up to any desired height. The cars to be stored are conveniently carried to a considerable distance above or below the ground floor. While primarily concerned with the saving of space in a horizontal direction the invention further contemplates the most efficient utilization of the cubic space content of the building.

Preferably I provide any suitable number of endless conveyor elements mounting temporary car storage cabins. The endless conveyors may be conveniently manipulated to rapidly bring any storage cabin into car receiving or delivering position.

The endless conveyors and the cabins which they carry preferably travel about a central space of the building which may be used as a permanent storage space, and may be horizontally subdivided into any number of floors.

Preferably the cabins of the endless conveyors are roofed over to effectively prevent a stored car from being soiled by grease drip from superjacent cabins or the well-lubricated conveying and guiding apparatus above it.

In a preferred embodiment of the invention, the cars are forwardly driven in to one side of the storage cabins, rotated partially around the central storage space and forwardly driven out of the other side of the storage cabins. Preferably two road levels are provided, one for driving in the cars, and the other for driving out the cars. The cabins by proper manipulation of the endless conveyor may be moved into alignment with any of the floors of the central storage space, so that cars may be driven from the cabins on to one side of the storage floors, and driven into the cabins off the other side of the storage floors.

It is to be noted, however, that while I refer to the use of permanent storage floors, an important feature of the invention is the storage of vehicles in movable storage compartments, or cabins which may be conveniently shifted to some distance from the point of reception or delivery of the cars, and so constructed that any storage compartment may be expeditiously moved to discharging or delivery position at any time.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein:

Figure 1:
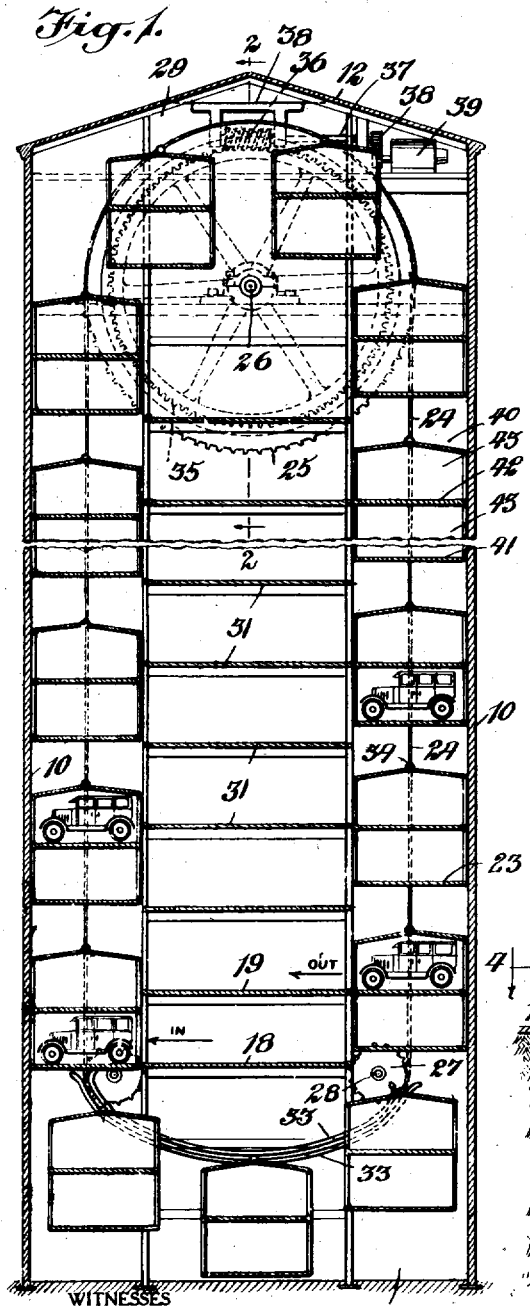
Figure 1 is a view in vertical section through a garage embodying the present invention.
Figure 2:
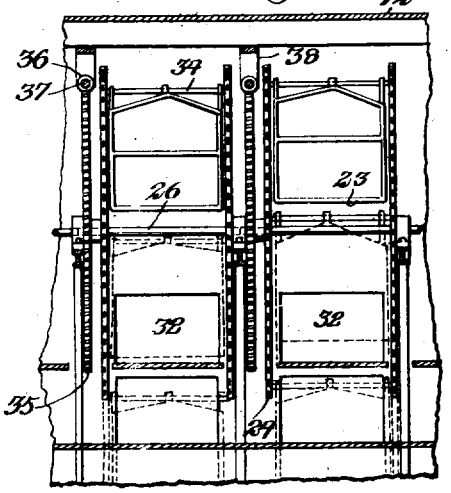
Figure 2 is a fragmentary vertical sectional view on the line 2—2 of Figure 1.

It is to be understood that the drawings which form part of this application are illustrative of only one embodiment of the invention, and are by no means to be interpreted in a limiting sense.

In the drawings I have shown a building including side walls 10, a front wall 11 and a roof 12. A driveway 13 enters the front of the building at the ground floor thereof and communicates with a downwardly inclined runway 14 for arriving cars, and an upwardly inclined runway 15 for departing cars. The roadway space between the two runways may be conveniently occupied by a building structure such as control house 16 housing all of the controls for the motor mechanism to be later described, and provided with windows 17 through which business may be transacted with the drivers of the cars as they pass down the runway 14 on to the receiving floor 18, or as they pass from the superjacent delivery floor 19 down the runway 15.

The building space indicated by the reference character 20 at opposite sides of the entering drive 13 and above the drive, may be conveniently used for office space or as a permanent storage space for cars, as will be later understood.

At each side of the building there is provided a vertical shaftway 21, and in these shaftways are mounted pairs of vertical guideways 22 for guiding the movement of storage cabins 23 carried on spaced endless conveyors 24.

The conveyors 24 run over pairs of relatively large spaced sprocket wheels 25 mounted on common horizontal bearing shafts or axles 26 journalled or keyed near the top of the building. The chains also run over idler sprockets 27 journalled on shafts 28 immediately below the receiving floor 18. Suitable space is provided at 29 in the top of the building and at 30 below the street level in the bottom of the building for the passage of the storage cabins from one shaftway 21 to the other.

Figure 3:
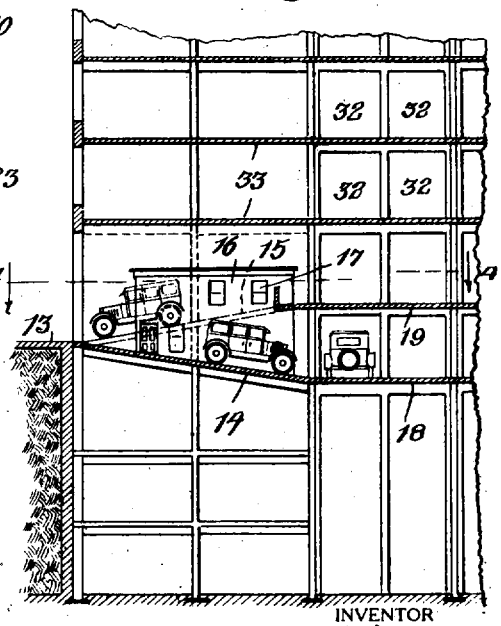
Figure 3 is another fragmentary vertical sectional view approximately on the line 3—3 of Figure 4.

The cabins in their travel thus pass completely around a central space which is preferably vertically divided into a number of floors 31 upon which cars may be stored for relatively long periods of time. As best seen in Fig. 3, the receiving and delivery floors 18 and 19, and also all of the storage floors 31 above them communicate by doorways 32 with the shaftways 21 so that by horizontally aligning the cabins 23 with any floor, a car may be driven from the cabin on to the floor at one side of the building or from the floor on to the cabin at the other side of the building.

Obviously, some means must be provided for guiding the movement of the endless conveyors and the cabins which they carry from one shaftway to the other. In the upper space the large sprocket wheels 25 are of sufficient size to effect the transfer from one shaftway to the other, their diameters equalling the distance between the center of one shaftway and the center of the other shaftway.

In passing through the lower space at 30, the sprocket chains travel between pairs of arcuate guide rails 33, these rails obviating the need for massive sprocket wheels at this point, such as would require deep expensive excavation work to permit the receiving and delivery floors to be near the street level. Preferably each endless conveyor assembly includes two conveyor chains 24 and cross rods 34 which connect the chains, and from which the cabins are hung for free swinging movement. The weight of the cabins will tend to retain them in horizontal position as they are transferred from one shaftway to the other, either between sprocket wheels 25 or under the guides 33.

Numerous expedients might be resorted to for properly driving the sprocket wheels 25. I prefer to employ driving gears 35 keyed to turn with the sprocket wheels and driven by worms 36 carried by shafts 37 which are journalled in suitable bearing hangers 37[a]. Shaft 37 may be driven through any suitable gear train indicated at 38 by motor 39.

Figure 4:
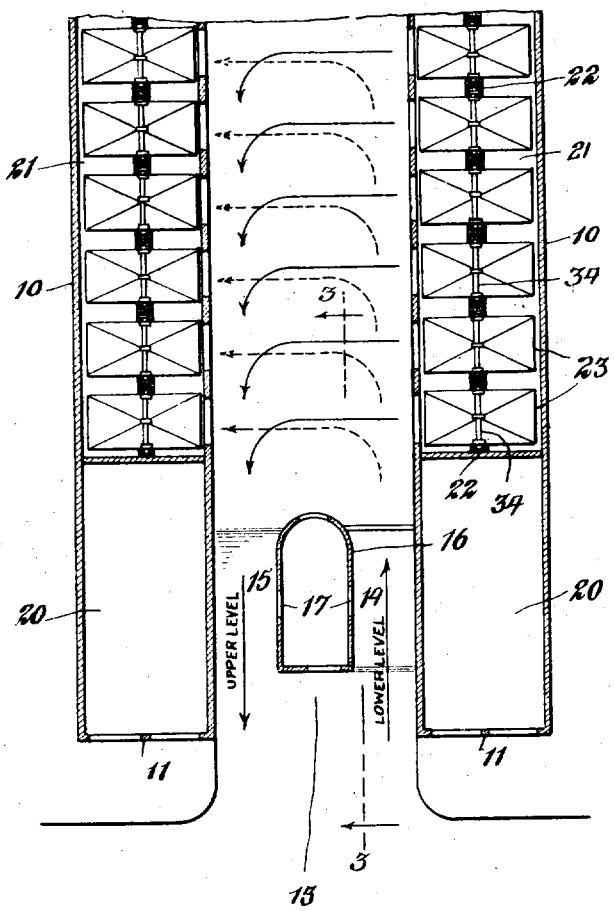
Figure 4 is a sectional plan view on the line 4—4 of Figure 3.

As seen by the fragmentary plan view, Fig. 4, there may be any suitable number of endless conveyor units and associated series of cabins. As for the construction of the cabins themselves, I prefer to use cabins of duplex type, that is to say, cabins which embody a ceiling 40, floor 41, and a central horizontal partition 42 which divides the cabins into upper and lower storage compartments 43. I am thus able to effect considerable space economy.

As suggested above there is preferably a set of suitable control mechanisms not illustrated, housed within the building structure 16, and with such control mechanism any one of the sets of endless conveyors may be manipulated to align either compartment of any cabin with either side of any floor. The cabins are open at both sides, and as best seen in Fig. 1, the cars are driven into the cabins at one side and driven out of the cabins at the other side after the cabins have been shifted from one shaftway to the other.

A great many cars may be expeditiously handled by the use of the separate receiving and delivery levels. The cabins will of course be numbered. The owner when calling for his car will present a ticket indicating the particular cabin number within which his car is stored, and the operator may shift one of the sets of endless conveyors in their direction to bring this cabin most expeditiously into alignment with the delivery floor 19.

Whether the space between the shaftways is used as an airshaft or for the accommodation of stored cars, or for any other purpose, is of course a matter to be decided in the case of each garage structure, and will depend upon the requirements of the trade.

The device of the present invention may be built as an addition to apartment houses and may be constructed in numerous ways other than that shown. In some instances the cabins serve as elevators rather than as storage compartments, but in a preferred embodiment of the invention the cabins are used for storing and not merely for transporting the vehicles.

Various changes and alterations might be made in the general form and arrangement of parts described without departing from the invention. Hence I do not wish to limit myself to the details set forth, but shall consider myself at liberty to make such changes and alterations as fairly fall within the spirit and scope of the appended claims.

I claim:

1. In a garage structure, a central storage space vertically subdivided in a plurality of storage floors, endless conveyors running around the central storage spaces, automobile storage cabins carried by the conveyors and adapted to be aligned with either side of any storage floor, certain of said lower floors constituting receiving and delivery floors for incoming and outgoing automobiles, and inclined runways connecting the receiving and delivery floors to a common driveway, at the ground floor of the structure.

2. In a garage structure, a central storage space vertically subdivided in a plurality of storage floors, endless conveyors running around the central storage spaces, automobile storage cabins carried by the conveyors and adapted to be aligned with either side of any storage floor, certain of said lower floors constituting receiving and delivery floors for incoming and outgoing automobiles, inclined runways connecting the receiving and delivery floors to a common driveway at the ground floor of the structure, and a house mounted centrally of the driveway between the runways.

3. In a garage building, spaced parallel shaftways extending longitudinally of the building, upper and lower crossways connecting the shaftways, connected series of storage cabins movable through the orbital paths defined by the shaftways and crossways, a car delivery floor disposed between the shaftways and above the lower crossway, means providing communication between said floor and the cabins in one shaftway, said floor communicating with the exterior of the building through one end of the latter and being of sufficient width so that a car driven into the building through the end thereof may be turned and driven into the cabins in said shaftway.

4. In a garage building, spaced parallel vertical shaftways extending longitudinally of the building, crossways connecting the shaftways at their tops and bottoms, storage cabins arranged to travel in the orbital paths defined by the shaftways and crossways, superimposed car receiving and delivery floors arranged between the shaftways and above the lower crossways and communicating with the exterior of the building through an end of the latter.

5. In a garage structure pairs of vertical shaftways, spaced upper and lower crossways connecting them, pairs of spaced guide wheels in the upper cross-way of a diameter substantially equal to the distance between centers of the opposite shaftways, pairs of spaced endless flexible devices running through the shaftways and crossways and over the wheels, car storage elements hung between the flexible devices and carried thereby, each element including spaced, superimposed rigidly connected car receiving platforms and superimposed car delivery and receiving floors adjacent one shaftway and with which the platforms are adapted to register.

6. In a garage structure, pairs of spaced vertical shaftways, spaced upper and lower crossways connecting them, pairs of spaced sprocket wheels in the upper crossway of a diameter substantially equal to the distance between centers of the opposite shaftways, pairs of spaced endless chains running through the shaftways and crossways and over the sprocket wheels, car storage cabins hung between the chains and carried thereby, each cabin being horizontally sub-divided to provide a plurality of car compartments, a car receiving, cabin-loading floor extending approximately from shaftway to shaftway.

7. In a garage structure pairs of spaced, vertical shaftways, spaced upper and lower crossways connecting them, pairs of spaced sprocket wheels in the upper crossway of a diameter substantially equal to the distance between centers of the opposite shaftways, pairs of spaced endless chains running through the shaftways and crossways and over the sprocket wheels, car storage cabins hung between the chains and carried thereby, each cabin being horizontally sub-divided to provide a pair of car compartments, a car handling floor extending approximately from shaftway to shaftway, said car handling floor communicating at one end with the exterior of the structure.

8. In a garage structure pairs of spaced vertical shaftways, spaced upper and lower crossways connecting them, pairs of spaced sprocket wheels in the upper crossway of a diameter substantially equal to the distance between centers of the opposite shaftways, pairs of spaced endless chains running through the shaftways and crossways and over the sprocket wheels, car storage cabins hung between the chains and carried thereby, each cabin being horizontally sub-divided to provide a pair of car compartments, superimposed car delivery and receiving floors arranged between the shaftways and communicating with the exterior of the building through one end of the latter, said storage compartments being open at both ends whereby a car may be driven ahead into a compartment at the receiving floor and driven ahead out of the compartment at the delivery floor after the compartment has been carried in a partially orbital path from one shaftway to the other.

9. In a garage structure pairs of spaced vertical shaftways, spaced upper and lower crossways connecting them, pairs of spaced sprocket wheels in the upper cross-way of a diameter substantially equal to the distance between centers of the opposite shaftways, pairs of spaced endless chains running through the shaftways and crossways and over the sprocket wheels, superimposed car receiving and delivery floors disposed between and communicating with the shaftways, car storage cabins hung between the chains and carried thereby, each cabin being horizontally sub-divided to provide a plurality of car compartments of a width and depth to conveniently accommodate an average sized car, any compartment of any cabin being adapted for registration with one side of the receiving floor or the other side of the delivery floor.

10. In a garage structure, a central space vertically sub-divided into a plurality of floors, endless conveyors running around the central space, automobile storage cabins carried by the conveyors and adapted to be alined with certain of said floors, certain of the floors constituting receiving and delivery floors for incoming and outgoing automobiles and inclined runways connecting the receiving and delivery floors to a common driveway at the ground floor of the structure.

11. In a garage structure, a central space vertically sub-divided into a plurality of floors, endless conveyors running around the central space, automobile storage cabins carried by the conveyors and adapted to be alined with certain of said floors, certain of the floors constituting receiving and delivery floors for incoming and outgoing automobiles and inclined runways connecting the receiving and delivery floors to a common driveway at the ground floor of the structure, and a control house mounted between the runways.

12. In a garage structure endless flexible devices, automobile storage cabins mounted on and carried in an orbital path by the conveyors, guide wheels in the top of the building actuating and guiding the movement of the flexible devices and arcuate guide rails in the bottom of the building guiding the movement of the conveyors.

13. In a garage building, spaced parallel vertical shaftways, upper and lower crossways connecting them, spaced endless cabin-carrying flexible devices arranged to travel through the shaftways and crossways, guide wheels in the upper crossway guiding the movement of the flexible devices and generally curved guide rails in the lower crossway receiving and guiding the flexible devices and a car receiving floor arranged between the shaftways above the lower crossway and closely adjacent the lower guides.

14. In a garage, a pair of spaced shaftways, vertically movable car conveyors traveling in the shaftways and superimposed car receiving and delivery floors disposed between the shaftways and communicating therewith and communicating with the exterior of the building through an end thereof.

ERNST GEIGER.